United States Patent
Tremelling et al.

(10) Patent No.: US 11,070,116 B2
(45) Date of Patent: Jul. 20, 2021

(54) ROTOR FOR A ROTATING ELECTRICAL MACHINE

(71) Applicant: ABB Schweiz AG, Baden (CH)

(72) Inventors: Darren D. Tremelling, Apex, NC (US); Colin Tschida, Durham, NC (US); Ghanshyam Shrestha, Cary, NC (US); Bahareh Anvari, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 81 days.

(21) Appl. No.: 16/517,262

(22) Filed: Jul. 19, 2019

(65) Prior Publication Data

US 2021/0021182 A1     Jan. 21, 2021

(51) Int. Cl.
*H02K 16/04* (2006.01)
*H02K 1/27* (2006.01)
*H02K 1/18* (2006.01)
*H02K 3/28* (2006.01)

(52) U.S. Cl.
CPC ............. *H02K 16/04* (2013.01); *H02K 1/185* (2013.01); *H02K 1/187* (2013.01); *H02K 1/27* (2013.01); *H02K 3/28* (2013.01)

(58) Field of Classification Search
CPC .......... H02K 1/187; H02K 1/27; H02K 1/185; H02K 3/28; H02K 1/28; H02K 16/00–16/04
See application file for complete search history.

(56) References Cited

U.S. PATENT DOCUMENTS

| 7,714,479 | B2 | 5/2010 | Seneff et al. |
| 2006/0087123 | A1* | 4/2006 | Stout .................. F02N 11/04 |
| | | | 290/2 |
| 2015/0275966 | A1 | 10/2015 | Tremelling et al. |
| 2016/0111926 | A1* | 4/2016 | Arimatsu .................. H02K 1/28 |
| | | | 310/156.31 |
| 2016/0164386 | A1 | 6/2016 | Kusase |
| 2017/0098989 | A1* | 4/2017 | Kitada .................. H02K 9/20 |
| 2020/0036236 | A1* | 1/2020 | Mihaila .................. H02K 1/27 |

OTHER PUBLICATIONS

"Pultrusion, n." OED Online. Oxford University Press, Sep. 2020. Web. Dec. 5, 2020. (Year: 2020).*
Exel Composites, "Exel Profiles: Composite Solutions for Lasting Performance," product brochure downloaded from the Internet at https://www.exelcomposites.com/Portals/154/documents/Brochures/Exel_Composites_Profiles_web.pdf on Jul. 19, 2019, 4 pp. (May 2017).

(Continued)

*Primary Examiner* — Thomas Truong
(74) *Attorney, Agent, or Firm* — Leydig, Voit & Mayer, Ltd.

(57) ABSTRACT

A rotating electrical machine of the double stator configuration includes a rotor shaped as a hollow cylinder disposed concentrically between an outer stator and an inner stator. The rotor can include plurality of radially spaced magnet cavities configured to receive permanent magnetic bars. To provide sufficient stiffness and rigidity, the rotor may be made from fiber composite material. To simplify construction, the rotor can be assembled from a plurality of rotor segments radially arranged about an axis line in which the magnet cavities are disposed.

20 Claims, 5 Drawing Sheets

(56) References Cited

OTHER PUBLICATIONS

Strongwell, "Custom Pultrusions," product brochure downloaded from the Internet at https://www.strongwell.com/wp-content/uploads/2013/04/Custom-Pultrusions-Brochure.pdf on Jul. 19, 2019, 8 pp., (2017).

Liebherr, "Slewing bearings," product page downloaded from the Internet at https://www.liebherr.com/en/usa/products/components/large-diameter-bearing/large-diameter-bearing.html on Jul. 19, 2019, 3 pp.

* cited by examiner

ROTOR FOR A ROTATING ELECTRICAL MACHINE

BACKGROUND

Rotating electrical machines broadly describe devices that covert a rotating mechanical force into electricity, in the case of a generator, or conversely convert electricity into a mechanical force, in the case of a motor. These machines typically include a stationary component referred to as the stator and a rotating component referred to as the rotor that is mounted on a shaft that in turn connects to the prime mover or mechanical load. The rotor and stator are electromagnetic components that include magnets and electrical conductors called windings or coils arranged to electromagnetically interact with each other. In the case of radial flux machines, the rotor and stator are separated by a small annular air gap that is traversed by the magnetic flux associated with the magnets and that electromagnetically links the rotor and stator. When the strength or orientation of the magnetic flux is made to change or vary in time, either by inputting a rotational motion from a mechanical force or changing the electrical current in the windings, electromagnetic induction produces an opposite output, e.g., generation of electrical current in the former instance and mechanical torque in the latter. A specific example of a rotating electrical machine is referred to as a double-stator arrangement in which the rotor is concentrically disposed between an outer stator and an inner stator thereby providing two air gaps traversed by the magnetic flux. An advantage of the double-stator arrangement is that the electromagnetic motive forces between the components is increased, often without a corresponding increase in the dimensional size of the rotating electrical machine. The present disclosure is directed to the construction and operation of rotating electrical machines of the foregoing type and may find particular application to machines of the double-stator arrangement.

BRIEF SUMMARY

The disclosure provides a rotating electric machine of the double-stator configuration having a rotor that may be constructed from fiber composite material. The rotor can be shaped as a hollow cylinder defining an axis line for concentric arrangement with respect to the outer and inner stators. To incorporate permanent magnets in the rotor, a plurality of magnet cavities can be radially disposed into a support annulus of the cylindrical rotor to axially align with the axis line. Bars made of magnetic material can be inserted into the magnet cavities to align in parallel with the axis line. In an example, the support annulus can be assembled from a plurality of rotor segments, each forming a part of the arc of the cylindrical rotor and each of which includes a magnet cavity. The rotor segments can be manufactured from a pultrusion process which aligns the fibers of the fiber composite material with the axis line. A possible advantage of the disclosure is that the rotor is sufficiently stiff to resist distortion or displacement with respect to the axis line to avoid contact with the concentric stators. This and other possible advantages and features will be apparent from the following detailed description and accompanying drawings.

DETAILED DESCRIPTION

Figure 1:
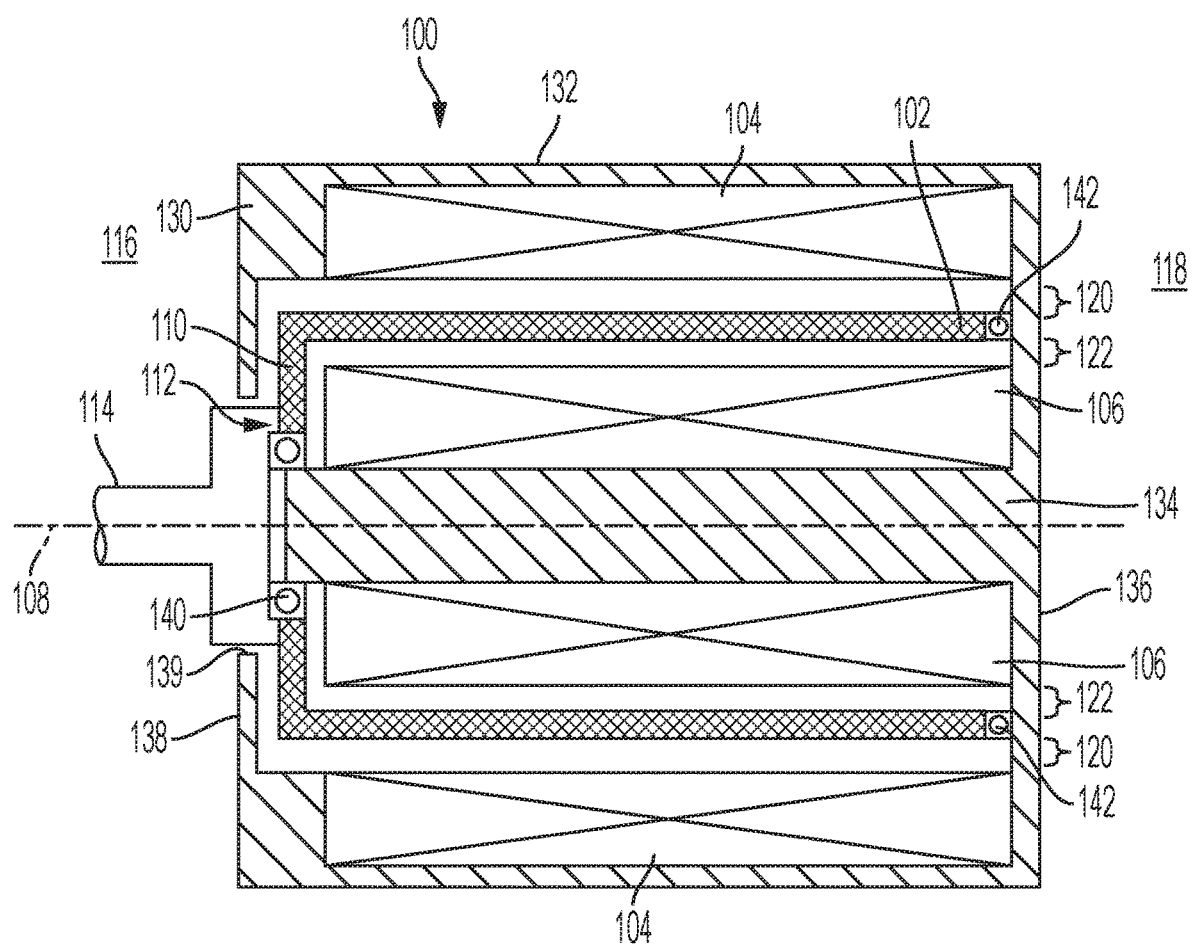
FIG. 1 is a longitudinal, cross-sectional view of an example of a double-stator rotating electrical machine having a rotor circumferentially disposed between an inner stator and an outer stator.

Now referring to the drawings, wherein like reference numbers refer to like elements, there is illustrated schematic example of a rotating electrical machine 100 for converting between mechanical and electrical energy through electromagnetic interaction. The rotating electrical machine 100 can be a generator for converting rotating mechanical force (i.e., torque) to electricity, a motor for converting electrical force to mechanical torque, or a motor-generator that can selectively perform either energy conversion process. The rotating electrical machine 100 can be of any suitable type and operating principle in accordance with the broad aspects of the disclosure. The rotating electrical machine 100 may utilize alternating current or direct current and can be configured for single phase or polyphase electrical operation. In the illustrated example, the rotating electrical machine 100 may be of a double-stator arrangement, although aspects of the disclosure may be applicable to other arrangements. The disclosure may be particularly applicable to large scale rotating electrical machines such as, for example, wind turbines where size and weight are particular concerns, but aspects of the disclosure may be applicable to electrical machines of any size or construction and can be used in any suitable application.

The electromagnetically interacting components of the double-stator arrangement include a rotor 102 concentrically disposed between an outer stator 104 and an inner stator 106 that are circumferentially aligned along and define an axis line 108. The axis line 108 therefore indicates an axial direction and a radial direction with respect to the rotating electrical machine 100. To enable its placement between the inner and outer stators 104, 106, the rotor 102 can be shaped as a hollow, elongated cylinder or tube. One end of the hollow cylindrical rotor 102 can be generally closed by a rotor flange 110 that can be shaped as an annular disk with a central aperture 112. Mounted to the rotor flange 110 can be a protruding rotatable shaft 114 aligned on the axis line 108 that is in operative connection with the load or prime mover. The shaft 114 can therefore define the drive end 116 and the non-drive end 118 of the rotating electrical machine 100. However, in other configurations, the rotating electrical machine 100 can be a double ended machine having shafts 114 mounted to and extending from either end of the rotor 102. The rotor 102 can accommodate or include one or more permanent magnets, such that the rotating electrical motor 100 is a permanent magnet device, the details of which are described below.

The outer stator 104 and the inner stator 106 can accommodate or include electrical conductors, for example, copper wires arranged into a plurality of windings or coils to electromagnetically interact with the permanent magnets in the rotor 102. To enable being disposed radially around and external to the rotor 102, the outer stator 104 can be shaped as a hollow, elongated tube larger in diameter than the rotor 102 and concentrically circumscribing and generally axially coextensive with the rotor 102. Similarly, to enable being disposed radially inside the rotor 102, the inner stator 106 can have a cylindrical shape, smaller in diameter than the inner diameter of the rotor and coaxial with the axis line 108. To allow relative rotation between the electromagnetic components, the rotor 102 and the inner and outer stators 104, 106 may be sized and dimensioned to provide a radially outer annular gap 120 between the rotor 102 and outer stator 104 and a respective radially inner annular gap 122 between the rotor and inner stator 106. The outer and inner annular gaps 120, 122 provide running clearances between the electromotive components of the rotating electrical machine 100. To amplify the electromagnetic interaction between the electromagnetic components by, for example, concentrating the magnetic flux interaction between the rotor 102 and stators 104, 106, the radial size of the outer and inner annular gaps 120, 122 between the electromagnetic components are configured to be small as feasible while allowing for relative rotation between the components without contact.

To support and coaxially align the rotor 102 and the outer and inner stators 104, 106 while maintaining the outer and inner annular gaps 120, 122 to avoid contact between components during relative rotation, the electromagnetic components can be accommodated in a frame 130 that functions as the housing of the rotating electrical machine 100. The frame 130 can be formed as a forged steel casing, although in smaller or lighter examples of the rotating electrical machine 100 the frame 130 can be made of formed sheet metal. The frame 130 can include a tubular outer periphery 132 to which the outer stator 104 is fixedly mounted by any suitable securing mechanism such as fasteners, press-fitting, etc. To dispose the inner stator 106 coaxially inside the hollow cylindrical rotor 102, the frame 130 can include a central pedestal 134 axially extending from a first axial end face 136 of the frame 130, which the inner stator 106 is fixedly mounted on. A second axial end face 138 of the frame 130, opposite the first axial end face 136, can include a frame aperture 139 through which the shaft 114 can protrude. To enable the rotor 102 to rotate with respect to the fixed frame 130, the rotor flange 110 can be rotatably supported on the central pedestal 134 by a bearing 140 disposed in the central aperture 112. The bearing 140 further provides axial spacing and separation between the rotating shaft 114 and the fixed central pedestal 134 at the drive end 116 of the rotating electrical machine 100. The end of the rotor 102 proximate to the non-drive end 118 can be rotatably supported at the first axial end face 136 by another bearing 142 or the like. The bearings 140, 142 can have any suitable construction, such as roller element bearings or magnetic bearings, for supporting a rotating load like the rotor 102.

Figure 2:
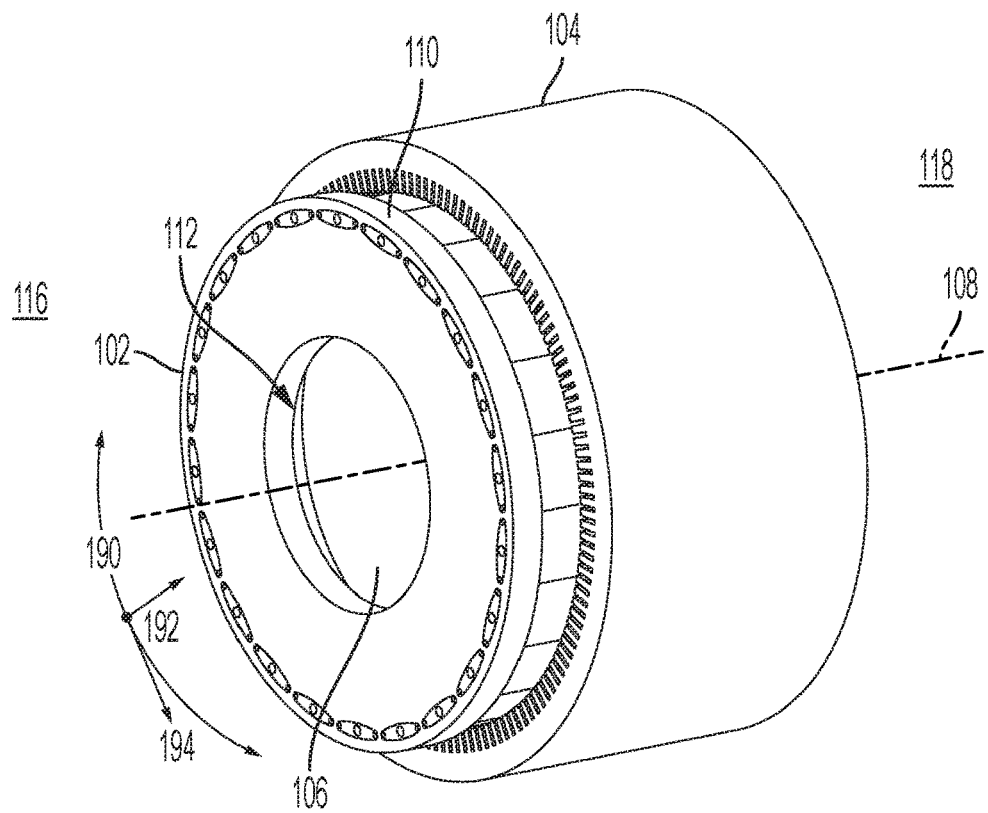
FIG. 2 is a perspective view of the electromagnetic components including the rotor and the outer and outer stators from the drive end of the electrical machine.
Figure 3:
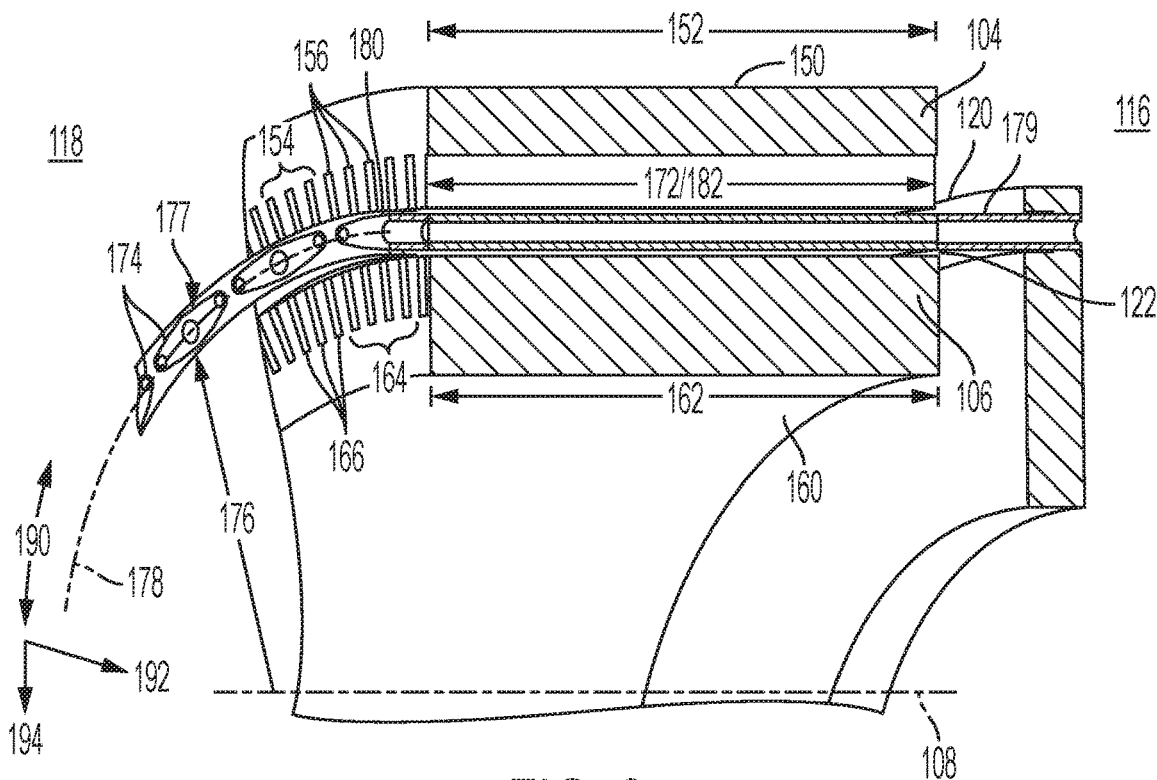
FIG. 3 is a partial sectional view illustrating the electromotive interaction between the rotor and the outer and inner stators from the non-drive end of the rotating electrical machine.

Referring to FIGS. 2 and 3, there is illustrated the exposed rotor 102 and outer and inner stators 104, 106 absent the frame and supporting elements. The outer and inner annular gaps 120, 122 separating the electromagnetic components are reduced in size to improve the electrical magnetic interaction between the components. The outer stator 104 circumferentially and concentrically surrounds the rotor 102 that in turn circumferentially and concentrically surrounds the inner stator 106. The structural component of outer stator 104 can include a solid annular outer core 150 circumscribing the axis line 108 and having an axial outer stator length 152. Disposed radially into the inner cylindrical periphery of the annular outer core 150 can be a plurality of outer teeth 154 that axially extend along the axial outer stator length 152. The outer teeth 154 can accommodate the outer conductive windings 156 or a coil that is formed by winding a conductor like copper wiring about the outer teeth 154. To magnetically interact with the rotor 102, the annular outer core 150 can be made from magnetically permeable, rigid material like steel, iron, or silicon iron formed as an integral casting or assembled from a plurality of bound laminations. The inner stator 106 can also include a solid annular inner core 160 circumscribing the axis line 108 and having an axial inner stator length 162 that may be axially coextensive with the axial outer stator length 152. To accommodate the inner conductive windings 166 or coil, a plurality of inner teeth 164 are radially disposed into the outer cylindrical periphery of the annular inner core 160. The annular inner core 160 can be made of the same magnetically permeable material as the outer stator core 150.

The rotor 102 can include a support annulus 170 dimensioned to radially fit between the annular outer and inner cores 150, 160 of the respective outer and inner stators 104, 106. The support annulus 170 may have an axial rotor length 172 that can be coextensive with the axial outer stator length 152 and the axial inner stator length 162. To accommodate a plurality of permanent magnets, the support annulus 170 can include a plurality of radially spaced magnet cavities 174 axially disposed across the axial rotor length 172. In an example, the magnet cavities 174 may provide an enclosed space within the body of the support annulus 170 between an outer rotor diameter 176 and an inner rotor diameter 177 that define the radial rotor thickness. In a further example, the centers of the magnet cavities 174 can be radially disposed along a circular centerline 178 having a diameter approximately equally between the outer rotor diameter 176 and the inner rotor diameter 177. To mount the rotor flange 110 to the support annulus 170, inserts 179 may be inserted in and partially protrude from the magnet cavities 174 proximate the drive-end 116 that can be received in corresponding cavities disposed in the rotor flange.

The permanent magnets can be formed as elongated magnetic bars 180 sized and shaped to be interested into the magnet cavities 174 and that can have an axial magnet length 182 that is coextensive with the axial rotor length 172. The magnetic bars 180 are characterized by producing a magnetic field between north and south poles that attracts ferromagnetic materials. The magnetic bars 180 can be further characterized as "hard" magnets demonstrating high magnetic coercivity and a resistance to demagnetization. In an example, to facilitate insertion into the magnet cavities 174, the magnetic bars 180 can be constructed from a plurality of individual magnetic pieces each shorter than the axial magnet length 182 and that can abut with each other in the magnet cavities 174.

In operation, a magnetic flux from the magnetic bars 180 traverses the outer and inner annular gaps 120, 122 and passes through the outer and inner stators 104, 106 facilitated by the magnetic permeable material of the annular outer and inner cores 150, 160. The magnetic flux therefore can inductively interact with the outer and inner windings 154, 164 about the respective cores 150, 160. If the magnetic flux is made to rotate, for example, by rotation of the rotor 102 through application of mechanical torque, the magnetic flux will induce a current in the conductive windings 156, 166. Conversely, application of alternating current that cyclically varies over time to the outer and inner conductive windings 156, 166 will create a rotating magnetic field attracting the magnetic bars 180 disposed in the support annulus 170 that produces mechanical torque in the rotor 102. Both circumstances involve rotation of the rotor 102 relative to the outer and inner stators 104, 106 about the axis line 108, for example, in the rotational direction indicated by arrow 190. The rotation can be further characterized as a plurality of forces associated with rotational movement 190 of the mass of the rotor 102, including a centrifugal or centripetal force component 192 that is radially directed and normal to the rotation direction 190, and a tangential force component 194 tangential to the rotation direction 190. If an imbalance occurs, especially at sufficiently high RPMs, due, for example, to an eccentric offset between the rotor 102 and the axis line 108, magnetic attraction between the magnetic bars 180 and the annular outer and inner cores 150, 160, sudden changes in the load or eccentric loading on the rotor 102, or for any other reason, the forces 192, 194 may tend to move the rotor 102 to traverse the outer and/or inner annular gaps 120, 122 and into contact with the outer or inner stators 104, 106, possibly damaging or seizing the rotating electrical machine 100.

To address such imbalances and avoid contact between the electromagnetic components, in an aspect of the disclosure, the support annulus 170 of the rotor 102 may be made from fiber composite material. A fiber composite material includes lengths of fibers such as glass or carbon that function as reinforcements providing stiffness, strength, and rigidity and that are bound and held together in a matrix such as a polymer. The fiber composite material can be selected from any suitable group of polymer matrixes and fiber components, including any natural or synthetic materials. The fiber composite material reduces the weight of the rotor 102 and improves the structural properties such as stiffness of the support annulus 170 to resist bending or distortion during operation. The improved stiffness maintains the rotor 102 in coaxial alignment with the axis line 108, and prevents physical distortions or displacement of any given portion of the rotor 102 along the axial rotor length 172. The fiber composite rotor 102 thereby maintains concentric spacing with respect to the outer and inner stators 104, 106 defined by the outer and inner annular gaps 120, 122. In an example, the fiber composite material can be selected to have a low coefficient of thermal expansion and contraction to further assist in maintaining the concentric alignment and spacing of the electromagnetic components. Misalignment is further prevented in the example where the magnet cavities 174 and magnetic bars 180 accommodated therein are aligned along the circular centerline 179 of the support annulus 170 which provides better rotational balance with respect to the axis line 108. Another advantage of utilizing fiber composite material is that the improved stiffness and reduction in weight reduces the complexity of the arrangement and/or construction of the bearings 140, 142 supporting the rotor 102 within the electrical machine.

Figure 4:
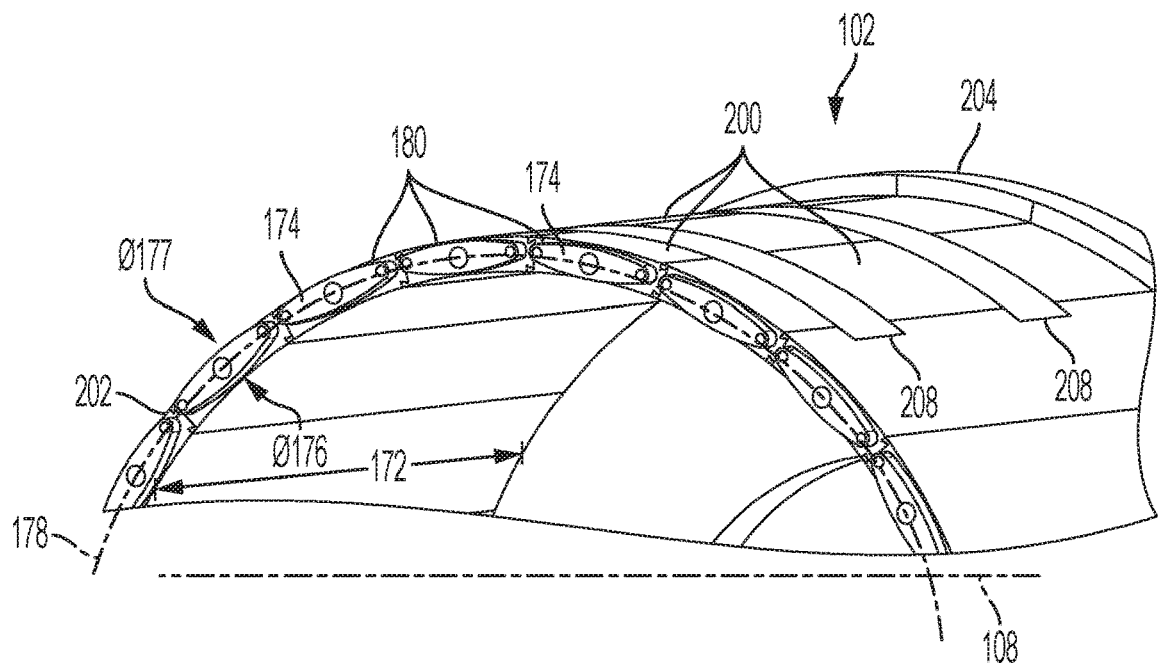
FIG. 4 is a perspective view of the rotor having a hollow, cylindrical shape and made from a plurality of rotor segments each accommodating a plurality of permanent magnets in magnet cavities disposed in the rotor segment.
Figure 5:
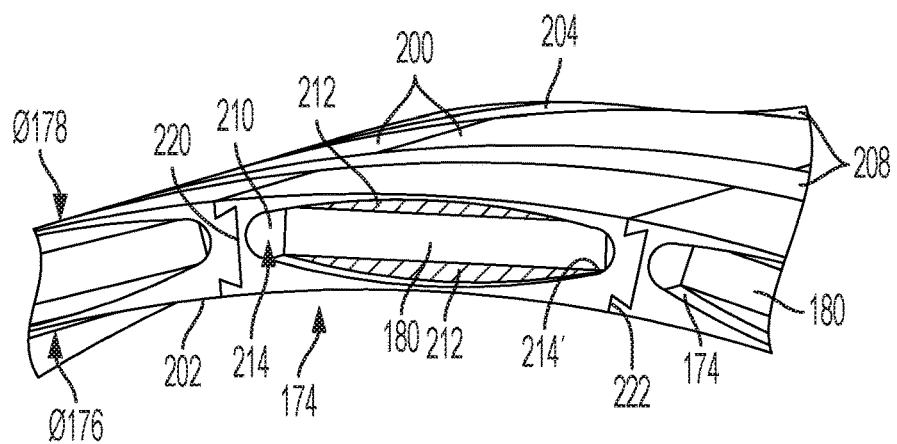
FIG. 5 is a detailed perspective view of an example of a rotor segment defining the magnet cavity that may be utilized to assemble the hollow, cylindrical shaped rotor.

In an example, the support annulus 170 can be manufactured as a single integral component, for example, by an injection molding or injection casting process. In another example, the support annulus 170 can be extruded by pushing the fiber composite precursors through a die having an annular cross-section. In such cases, the support annular 170 can be made from polyvinyl chloride (PVC) or another suitable thermoplastic material. However, to facilitate assembly of rotating electrical machines 100 of sufficiently large sizes, for example, with a rotor diameter of a meter and a large number of poles (e.g., greater than 20 poles), the support annulus 170 can be assembled from a plurality of subcomponents and parts. Referring to FIGS. 4 and 5, there is illustrated an example of a rotor 102 in which the support annulus 170 is made from a plurality of rotor segments 200 that are formed as elongated staves or planks of composite fiber material each corresponding to a circular segment or partial arc of the cylindrical rotor 102. Each rotor segment 200 may extend between a first segment axial end 202 and an opposite second segment axial end 204 that are coextensive with the axial rotor length 172 of the rotor 102. Moreover, each rotor segment 200 can have a curved or arched shape corresponding generally to the outer and/or inner rotor diameter 176, 177 of the rotor 102. To form the cylindrical shape of the support annulus 170, the plurality of rotor segments 200 are arranged adjacent to each other extending parallel to the axis line 108 and radially disposed around the axis line 108. One or more hoops 208, made from for example a strap or tie, can be disposed around the exterior periphery of the radially arranged plurality of rotor segments 200 to apply a radially inward compressive force holding the adjacent support segments 200 in place, similar to construction of a barrel.

Figure 6:
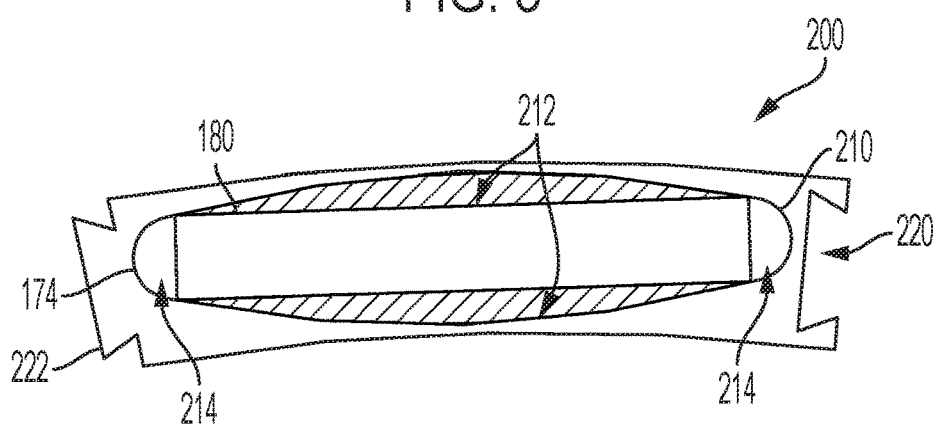
FIG. 6 is front plan view of the rotor segment with a magnetic bar inserted in the magnet cavity and shaped to provide a clearance fit with voids and ventilation passages.

To receive and accommodate the magnetic bars 180, each rotor segment 200 includes a magnet cavity 174 that extends between the first segment axial end 202 and the second segment axial end 204. The magnet cavities 174 can be enclosed in the thickness of each rotor segment 200 between outer and inner rotor diameters 176, 177 so that the magnetic bar 180 is fully encompassed within the diametrical dimensions of the rotor 102. Referring to FIGS. 5 and 6, the magnetic bar 180 may be sized to form a clearance fit with the magnet cavity 174. For example, the magnetic bar 180 can have a rectangular cross-section with a given height and width and the magnet cavity 174 can have a dimensionally larger cross-section, for example, with a non-rectangular cross-section of a generally elliptical or lozenge shape having a larger height and/or width. The clearance fit defines a void 210 between the inner periphery of the magnet cavity 174 and the magnetic bar 180. To secure the magnetic bar 180 within the magnet cavity 174, in an example, soft magnetic composite ("SMC") 212 can be adhered to the magnetic bar 180 to occupy the clearance fit. The soft magnetic composite 212 can be made of iron powder that can be pressed into various shapes by powered metallurgy and can be easily magnetized to enhance the magnetic permeability of the rotor 102. In a further example, the void 210 created by the clearance fit between the magnet cavity 174 and the magnetic bar 180 provides axial ventilation passages 214 extending the length of the rotor segment 200 between the first and second segment axial ends 202, 204. The ventilation passages 214 provide cooling to reduce heat buildup from operation of the rotating electrical machine 100.

Continuing with reference to FIGS. 5 and 6, in an example, to facilitate assembly of the support annulus 170 of the rotor 102 from the plurality of rotor segments 200, the rotor segments 200 can formed with cooperating tongue and groove features. Each rotor segment 200 can include a first arc edge 220 and a second arc edge 222, which correspond to the width of the rotor segment and traverse the thickness between the outer and inner rotor diameters 176, 177 and that extend between the first and second segment axial ends 202, 202. Included on the first arc edge 220 can be a groove and included on the second arc edge 222 can be a corresponding tongue. When the rotor segments 200 are placed radially adjacent to each other, the tongues and grooves cooperatively interlock to add rigidity and support to the support annulus 170. In an example, the tongue and groove can be a dovetail joint with interlocking trapezoidal features that may slidably engaged with each other. The interlocking dovetail joints lock radially adjacent rotor segments 170 together in a manner to maintain the outer and inner rotor diameters 176, 177, ensuring the outer and inner peripheral surfaces are smooth and will preserve the precise dimensions of the outer and inner annular gaps when the rotating electrical machine is assembled.

Figure 7:
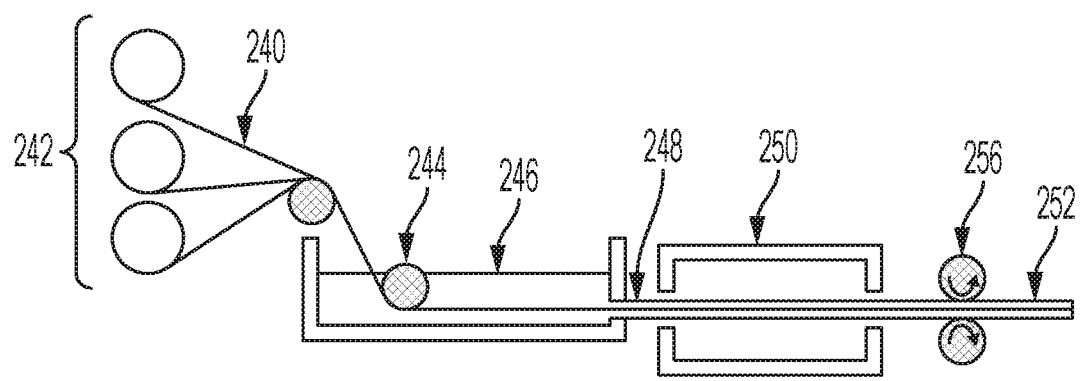
FIG. 7 is a schematic diagram of a pultrusion manufacturing process for producing the rotor segment from a fiber composite material.
Figure 8:
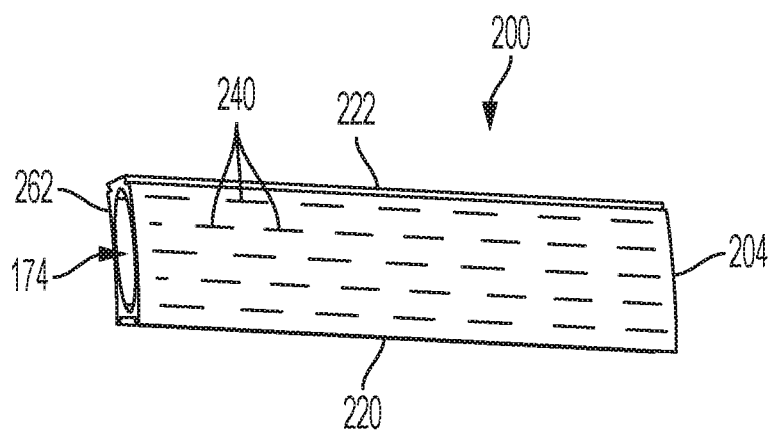
FIG. 8 is a perspective view of a blank for the rotor segment manufactured from a fiber composite by the pultrusion process and illustrating the axial alignment of the fibers.

Referring to FIGS. 7 and 8, there is illustrated an example of a process for manufacturing the rotor segments 200 from a fiber composite material including fiber reinforcements disposed in a matrix. The rotor segments 200 can be manufactured from the fiber and matrix precursor materials utilizing a pultrusion process in which the precursor materials are continuously pulled through the processing operations, which is in contrast to the extrusion process described above. Referring to FIG. 7, in a pultrusion process, continuous fibers 240, such as carbon or glass, are supplied on one or more wound rolls 242. The continuous fibers 240 are unwound and directed by tensioning rollers 244 into a matrix bath 246, which may be a tank containing the matrix in liquid form such as, for example, polyester, polyurethane, epoxy, or other resins. The liquid matrix coats the continuous fibers 240, which are then directed through a heated die 248 that forms and shapes the coated fibers 240 into the continuous constant cross-section of the rotor segment. After shaping, the coated fibers 240 are directed into a heated oven 250 where the liquid matrix polymerizes, cures, and/or hardens on the fibers forming a solid, cured profile 252. The cured profile 252 can be cut to the desired size of the final rotor segments 200 with multiple segments cut from a single cast profile. As indicated by the process name, various pulling rollers 256 are used to continuously pull the precursor materials through the process.

Referring to FIG. 8, there is illustrated a finished rotor segment 200 manufactured from fiber composite material by the pultrusion process. An advantage of the pultrusion process to manufacture the rotor segments 200 is a unidirectional alignment of the fibers in the rotor segment. The continuous fibers 240 can be aligned lengthwise in rotor segment 200 between the first and second axial segment ends 202, 204 as a result of the fibers having been prealigned and pulled lengthwise through the protrusion process. The fibers 240 are therefore aligned in the axial orientation, parallel to the axis line 108 of the rotating electrical machine 100, when the rotor 102 is assembled from the plurality of rotor segments 200 radially arranged into the support annulus 170. Axial alignment of the fibers 240 provides the rotor 102 with improved stiffness that counters eccentric displacement or deflection of the rotor 102 tending to cause contact with respect to the stators 104, 106, and that may avoid seizing of the rotating electrical machine 100. The use of lightweight fiber composite material for the rotor 102 with improved stiffness also enables minimization of the outer and inner annular gaps 120, 122 thereby amplifying electromagnetic interaction between the rotor 102 and the outer and inner stators 104, 106 increasing output of the rotating electric machine 100.

In an example, to accommodate temporary or intermittent contact between the rotor 102 and the outer stators and/or inner stators 104, 106 in the event of a fault or temporary power outage, one or more hoops may be generally disposed in the outer annular gap 120 or inner annular gap 122 respectively. In the foregoing example, a slot can be disposed in the inner cylindrical surface of the outer stator 104 and a slot can be disposed in the outer cylindrical surface of the inner stator 106 to accommodate the hoops. The hoops may partially protrude from the slots slightly beyond the outer teeth 154 and the inner teeth 164, respectively, and into the outer and inner annular gaps 120, 122 as the case may be to allow for brief contact with the rotor 102 in the event the rotating electromotive components become misaligned. The hoops can make temporary sliding contact with the fiber composite material of the rotor 102.

Figure 9:
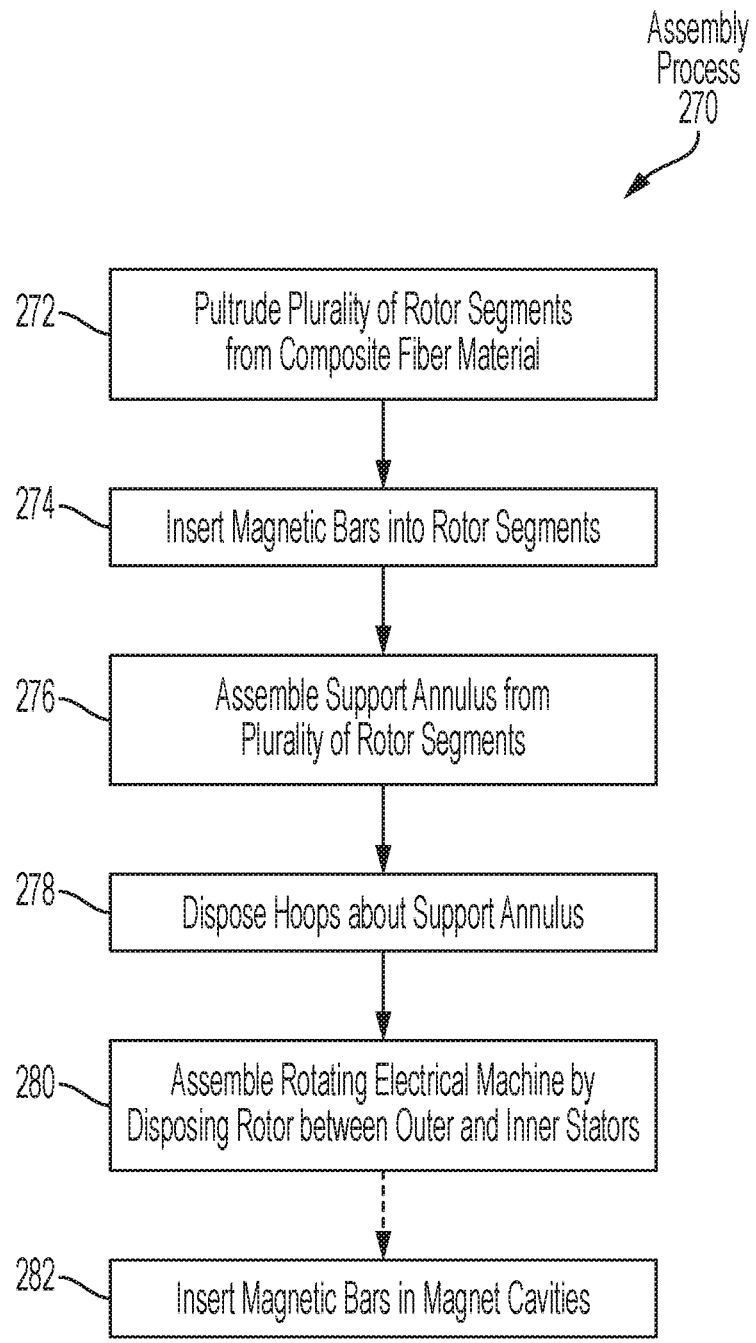
FIG. 9 is a flowchart illustrating an exemplary method of assembling a rotor for a double-stator rotating electrical machine in accordance with the disclosure.

Referring to FIG. 9, there is illustrated a flowchart of an assembly process 270 for assembling a double stator rotating electrical machine 100. As described with respect to FIGS. 7-8, in the pultrusion step 272, fiber and matrix precursors can be formed into a continuous, cured profile of fiber composite material by a pultrusion process, which is cut into a plurality of rotor segments 200 of the desired lengths, for example, 100 mm. In a magnet insertion step 274, magnetic bars 180 are inserted into the magnetic cavities 174 of the rotor segments 200 to provide modular units that can be assembled into the rotor 102. In particular, in an annulus assembly step 276, a plurality of rotor segments 200 with magnetic bars 180 therein are placed in a radially adjacent arrangement to form the support annulus 170 circumferentially about and defining the axis line 108. To ensure the support annulus 170 is rigid and to maintain the outer and inner rotor diameters 176, 177, the arc edges 220, 222 of each rotor segment 200 can include tongue and groove features that can be slidably interlocked together. In a hooping step 278, one or more hoops 208 can be disposed about the exterior of the support annulus 170 to apply an inward force holding the adjacent rotor segments 200 together as a cylindrical rotor 102. In a machine assembly step 280, the assembled cylindrical rotor 102 can be concentrically disposed between an outer stator 104 and an inner stator 106, separated therefrom by the outer and inner annular gaps 120, 124 and can be made to rotate with respect to the axis line 108. In another example, rather than inserting the magnetic bar 180 into the magnetic cavities 170 prior to the annulus assembly step 176, the magnetic bars 180 can be inserted after the machine assembly step 280 once the rotor 102 is disposed between the outer stator 104 and the inner stator 106, as indicted by the insertion step 282. A possible advantage of performing the insertion step 282 after the machine assembly step 280 is that magnetic bars 180 and their associated magnetic attraction are not present while assembling the rotor 102 and outer and inner stators 104, 106, which could otherwise hinder or disrupt assembly and alignment of the rotating electromagnetic components.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A rotating electrical machine comprising:
    a rotor with a hollow cylindrical shape disposed around and defining an axis line between a drive end and an non-drive end of the rotating electrical machine, the rotor including a support annulus axially aligned with the axis line and made of a fiber composite material with the fibers generally aligned parallel with the axis line, the support annulus including a plurality of magnet cavities disposed therein and spaced radially around the support annulus, each magnet cavity receiving a magnetic bar;
    an outer stator disposed concentrically about the rotor and defining an outer annular gap there between, the outer stator including a first plurality of conductive windings wound thereon; and
    an inner stator disposed concentrically within the rotor and defining an inner annular gap there between, the inner stator including a second plurality of conductive winding wound thereon, the inner stator operatively connected to a shaft.

2. The rotating electrical machine of claim 1, wherein the support annulus includes a plurality of rotor segments disposed radially about the axis line, each rotor segment having one of the plurality of magnet cavities disposed therein.

3. The rotating electrical machine of claim 2, wherein each rotor segment is comprised of a fiber composite material.

4. The rotating electrical machine of claim 3, wherein each of the plurality of rotor segments are manufactured from a pultrusion process.

5. The rotating electrical machine of claim 4, wherein each rotor segment is an elongated stave extending between a first segment axial end and a second segment axial end.

6. The rotating electrical machine of claim 5, wherein the magnet cavity is disposed between the first segment axial end and the segment axial end and is enclosed within the rotor segment.

7. The rotating electrical machine of claim 6, wherein the magnet cavity and the magnetic bar form a clearance fit.

8. The rotating electrical machine of claim 7, wherein the clearance fit establishes a void between the magnet cavity and the magnetic bar.

9. The rotating electrical machine of claim 8, wherein the clearance fit defines at least on ventilation passage between the magnet cavity and the magnetic bar.

10. The rotating electrical machine of claim 9, further including a soft magnetic component partially disposed into the magnet cavity to secure the magnetic bar, the soft magnetic component including a magnetic metal powder.

11. The rotating electrical machine of claim 10, wherein the magnetic bar has a rectangular cross-section and the magnet cavity has a non-rectangular cross-section.

12. The rotating electrical machine of claim 2, wherein each rotor segment includes a first arc edge and a second arc edge, the first and second arc edges axially parallel to the axis line, the first arc edge including a tongue and the second arc edge including a groove configured to interlock with the tongue.

13. The rotating electrical machine of claim 2, further comprising at least one hoop disposed around the support annulus applying a radially inward compressive force on the plurality of rotor segments.

14. The rotating electrical machine of claim 2, further comprising a hoop disposed on at least one of the outer stator and the inner stator, generally within at least one of the outer annular gap and the inner annular gap respectively, to accommodate contact between the rotor and the outer or inner stator.

15. A method of assembling a rotor for a rotating electrical machine, the method comprising:
    pultruding a plurality of elongated rotor segments of fiber composite material, each rotor segment extending between a first segment axial end and a second segment axial end, each rotor segment including a first arc edge and a second arc edge and each rotor segment having a curved shape between the first arc edge and the second arc edge and of a radius generally corresponding to a rotor diameter, each rotor segment defining a magnet cavity extending between the first and second segment axial ends;
    inserting a magnetic bar into a magnet cavity of each of the plurality of rotor segments; and
    assembling a support annulus by circumferentially arranging the plurality of rotor segments in a radially adjacent manner with the first and second arc edges parallel to an axis line, the support annulus having a hollow cylindrical shape.

16. The method of claim 15, wherein the first arc edge includes a tongue and the second arc edge includes a corresponding groove configured to interlock with the tongue of a radially adjacent rotor segment.

17. The method of claim 16, further comprising disposing at least one hoop around the support annulus to apply a radially inward compressive force on the plurality of rotor segments.

18. The method of claim 15, wherein fibers of the fiber composite material are generally aligned parallel with the axis line.

19. A rotating electrical machine comprising:
    a rotor with hollow cylindrical shape disposed around and defining an axis line between a drive end and a non-drive end of the rotating electrical machine, the rotor including a support annulus made of a plurality of elongated rotor segments extending between a first segment axial end and a second segment axial end, the plurality of rotor segments disposed circumferentially about the axis line in a radially adjacent manner, each rotor segment including a first arc edge and a second arc edge parallel with the axis line and each rotor segment having a curved shape between the first arc edge and second arc edge of a radius corresponding generally to a rotor diameter and each rotor segment defining a magnet cavity with a magnetic bar received therein aligned parallel to the axis line;

an outer stator disposed concentrically about the rotor and defining an outer annular gap there between, the outer stator including a first plurality of conductive windings wound thereon; and an inner stator disposed concentrically within the rotor and defining an inner annular gap there between, the inner stator including a second plurality of conductive winding wound thereon, the inner stator operatively connected to a shaft.

20. The rotating electrical machine of claim 19, wherein each rotor segment is made of fiber composite material with fibers generally aligned in parallel with the axis line.

* * * * *